(12) United States Patent
Krol

(10) Patent No.: US 8,824,000 B2
(45) Date of Patent: Sep. 2, 2014

(54) ENHANCING THE APPEARANCE OF A HALFTONE IMAGE

(75) Inventor: Alexander Krol, Netanya (IL)

(73) Assignee: Eastman Kodak Company, Rochester, NY (US)

( * ) Notice: Subject to any disclaimer, the term of this patent is extended or adjusted under 35 U.S.C. 154(b) by 92 days.

(21) Appl. No.: 13/477,132

(22) Filed: May 22, 2012

(65) Prior Publication Data

US 2013/0314723 A1 Nov. 28, 2013

(51) Int. Cl.
*G06K 15/02* (2006.01)
(52) U.S. Cl.
USPC ........................................................ 358/1.2
(58) Field of Classification Search
None
See application file for complete search history.

(56) References Cited

U.S. PATENT DOCUMENTS

| 5,579,457 | A | 11/1996 | Hall |
| 5,689,623 | A | 11/1997 | Pinard |
| 5,766,807 | A | 6/1998 | Delabastita et al. |
| 5,892,588 | A | 4/1999 | Samworth |
| 6,515,768 | B1 * | 2/2003 | Deschuytere et al. ........ 358/3.06 |
| 7,468,814 | B2 * | 12/2008 | Lima .............................. 358/3.06 |
| 2005/0200900 | A1 * | 9/2005 | Hirano ........................... 358/3.06 |
| 2007/0008585 | A1 | 1/2007 | Karito |

FOREIGN PATENT DOCUMENTS

EP 1 557 279 A2 7/2005

* cited by examiner

*Primary Examiner* — Jeremiah Bryar
(74) *Attorney, Agent, or Firm* — Nelson Adrian Blish

(57) ABSTRACT

A method for enhancing appearance of a halftone image (204) for imaging on a flexographic plate (108) includes retrieving the halftone image from a data storage device (132); setting a minimal dot size value for printing; analyzing the halftone image with a computer (130); detecting areas (404) in the halftone image populated with a plurality of dots smaller than the minimal dot size value; replacing the plurality of dots with a reduced set of dots wherein each of the reduced set of dots are larger in size (504) than the plurality of dots and wherein each of the reduced set of dots maintains an original geometric characteristics of the plurality of dots; and saving the reduced set of dots.

6 Claims, 5 Drawing Sheets

ENHANCING THE APPEARANCE OF A HALFTONE IMAGE

CROSS REFERENCE TO RELATED APPLICATIONS

Reference is made to commonly-assigned U.S. patent application Ser. No. 13/477,138 (now U.S. Publication No. 2013/0314750) filed May 22. 2012, entitled RESCREENING SELECTED PARTS OF A HALFTONE IMAGE, by Krol; the disclosure of which is incorporated herein.

FIELD OF THE INVENTION

The present invention relates to the field of graphic arts, printing and publishing technologies, specifically, to image reproduction systems characterized by limited numbers of levels of optical parameters.

BACKGROUND OF THE INVENTION

In graphic arts technology there is a need for reproduction of continuous tone images by an imaging device. The imaging device, for example, a laser based imager is capable of producing a limited number of levels representing optical parameter (in most common cases only two levels are used—black and white). This goal is achieved by applying a process called screening, wherein a gray tone value which represents a pixel to be screened in the original image is simulated by means of varying relative area covered by dark elements (pixels) as compared to light elements.

Different screening methods exist. In one of the most common, an area of an image is reproduced by subdividing it into equal, periodically repeated sub-areas called mesh cells, containing variable-size dark elements (printing dots, alternatively called halftone dots). Relative area coverage is defined as ratio of dark element area to a mesh cell area. Such screening method is commonly called Amplitude Modulation (AM) screening. Such screen, with a regular, usually square grid structure, is characterized by a screen period and a screen angle. The reciprocal of this period is called screen frequency or screen ruling.

Particular problems arise when reproducing characteristics of printing dots which are size dependant. Examples of such processes are flexographic, offset and xerographic printing processes.

In flexographic printing, the size of the smallest halftone printing dot on a printing plate that can be consistently reproduced on press is usually around 40 microns in size. Below this size, halftone dots tend to print unevenly, and may also include drastic increase in size and produce large blot artifacts, or not printing at all. For commonly used line ruling of 120 lpi and commonly used device resolutions of 2400 or 2540 dpi, 40 micron halftone dot corresponds to area coverage of 3%; for line ruling 1500 lpi, it corresponds to area coverage around 4%. This may result in discontinuity, with annoying artifacts in certain cases especially in the highlight parts of printed images. The high dot gain that is associated with flexographic printing process enhances the effect and exacerbates the problem.

In the offset printing process, the minimal halftone printing dot that can be reproduced consistently can often be as small as 10 micron. For lower quality paper and high-speed printing presses, for example, in newspaper printing, the same fundamental problem discussed above exists. A similar situation exists in electro-photographic printing, wherein minimal printing dot size is often defined by physical characteristics of toner particles.

One solution for the above problems is using Frequency Modulation (FM) screening techniques with controlled minimal dot size, so-called "green noise" frequency modulation, shown in U.S. Pat. No. 5,689,623 (Pinard), or with controlled midtone clustering, so-called "second order" frequency modulation, shown in U.S. Pat. No. 5,579,457 (Hall). While solving the problem of highlight region reproduction, frequency modulation introduces its own drawbacks. Relatively rough feature size needed for proper highlights reproduction, often leads to grainy appearance both in highlights and in the midtones areas. Additionally, high circumference-to-area ratio inherent for FM generated printing dots leads to significantly higher dot gain compared to AM halftone screening. Considering that flexographic printing process is already characterized by high dot gain, FM screening may lead to significant contraction of the dynamic range for printed images.

Another solution is known as the "double dot" technique or "Respi screen." According to this technique, the extremes of tone scale, highlights and/or shadows, are rendered with halftone dots that are laid on a grid with the same angle, but with the frequency of the square root of the halftones in the rest of tone scale, thus halving the number of halftone dot and, consequently, doubling the size of each dot. This renders the transition area between extreme and main part of tone scale with halftone dots of two different sizes placed in checkerboard pattern. While moving the cutoff value for non reproducible part of the image farther to extreme parts of tone scale, it still does not completely solve the problem. Moreover, by introducing additional screen frequencies, such technique may produce highly undesirable moiré effects in multicolored images in case of regions where part of color separations are in extreme parts of the tone scale and other separations are in non-extreme part of the color scale.

In order to overcome the deficiencies above stated, an approach was proposed by U.S. Pat. No. 5,766,807 (Delabastita et al.). This method is known as "hybrid screening." In this approach, a "supercell" threshold matrix suitable for periodically tiling a plane is defined in such a way that it contains a plurality of locations for halftone dot centers and is filled with threshold values. When the matrix is used for screening a contone image, in the extreme parts of the tone scale halftone dot of predefined minimal size are produced, whereas in the remaining part of halftone dot centers no halftone dot are produced at all. This is performed in such a way that the area coverage for a whole supercell area corresponds to a tone value in the contone image. In other words, instead of modulating halftone dot size, below predefined dot percentage, dot size is kept constant but dot number is modulated as a function of tone value; accuracy of tone representation being defined by predefined minimal halftone dot size and count of halftone dot centers in supercell threshold matrix.

While free of most undesirable effects of previous solutions, this approach still has some problems. Notably, the supercell-based pattern is prone to grainy and "noisy" appearance; relatively rough quantization steps limited by number of halftone dot centers in a supercell threshold matrix may produce banding effects in vignette parts of image; "orphaned" and incomplete halftone dots still may produce undesirable "blot-like" artifacts; and supercell-based approach limits available number of screen angle/screen frequency combinations to those with rational tangent angles.

SUMMARY OF THE INVENTION

Briefly, according to one aspect of the present invention a method for enhancing appearance of a halftone image for imaging on a flexographic plate includes retrieving the halftone image from a data storage device; setting a minimal dot size value for printing; analyzing the halftone image with a computer; detecting areas in the halftone image populated with a plurality of dots smaller than the minimal dot size value; replacing the plurality of dots with a reduced set of dots wherein each of the reduced set of dots are larger in size than the plurality of dots and wherein each of the reduced set of dots maintains an original geometric characteristics of the plurality of dots; and saving the reduced set of dots to a storage device.

The invention and its objects and advantages will become more apparent in the detailed description of the preferred embodiment presented below.

DETAILED DESCRIPTION OF THE INVENTION

In the following detailed description, specific details are set forth in order to provide a thorough understanding of the disclosure. However, it will be understood by those skilled in the art that the teachings of the present disclosure may be practiced without these specific details. In other instances, well-known methods, procedures, components and circuits have not been described in detail so as not to obscure the teachings of the present disclosure.

While the present invention is described in connection with one of the embodiments, it will be understood that it is not intended to limit the invention to this embodiment. On the contrary, it is intended to cover all alternatives, modifications and equivalents as covered by the appended claims.

In order to improve the reproduction characteristics of a halftoned image by of controlling halftone dot size and spatial distribution in extreme tone scale parts of said image, a halftone image already screened by means of traditional Amplitude Modulation (AM) screening is conceptually represented as rectangular array of black and white pixels. The present invention is not limited by any specific type, algorithm or method of AM screening and utilizes only two basic characteristics of AM screening, namely parameters of a periodic grid, its angle and its frequency represented by its line ruling, i.e. mesh, and derived parameter such as res/mesh ratio, equal to side length of single mesh cell in units of single pixel size.

Figure 1:
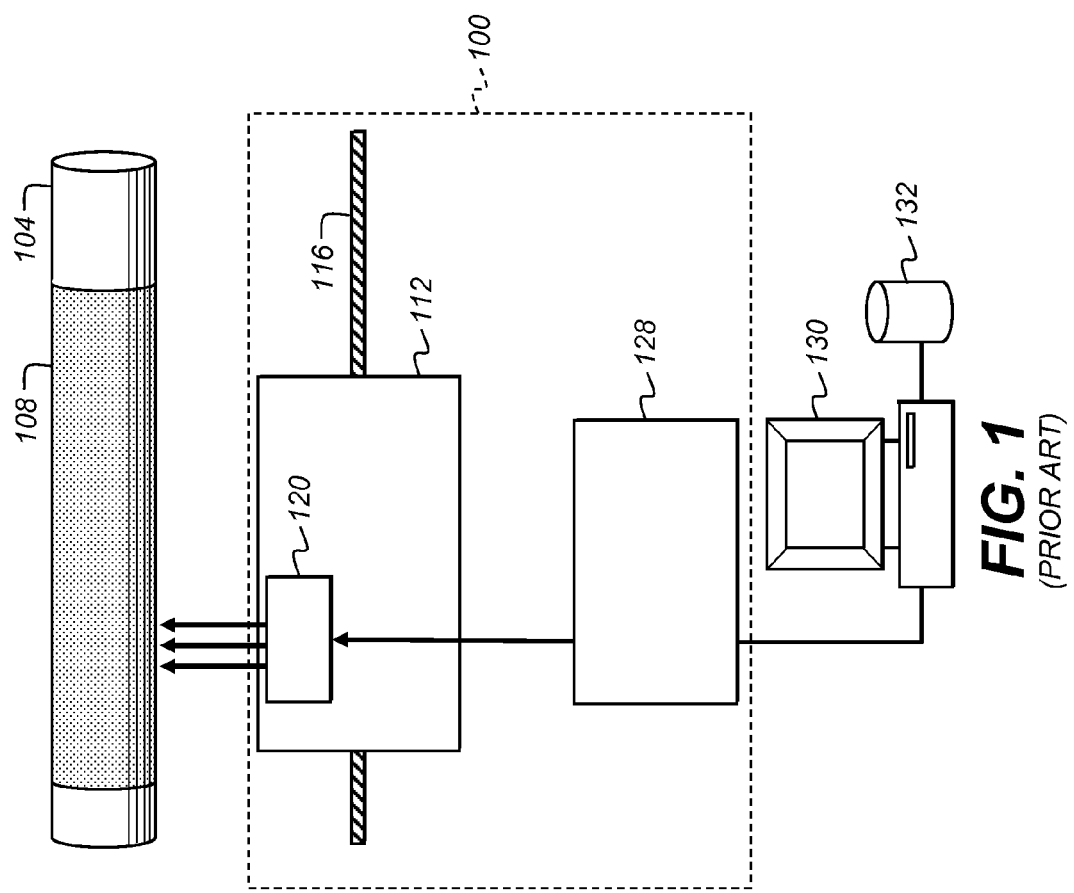
FIG. 1 represents in diagrammatic form a prior art imaging system adapted to expose flexographic plates.
Figure 2:
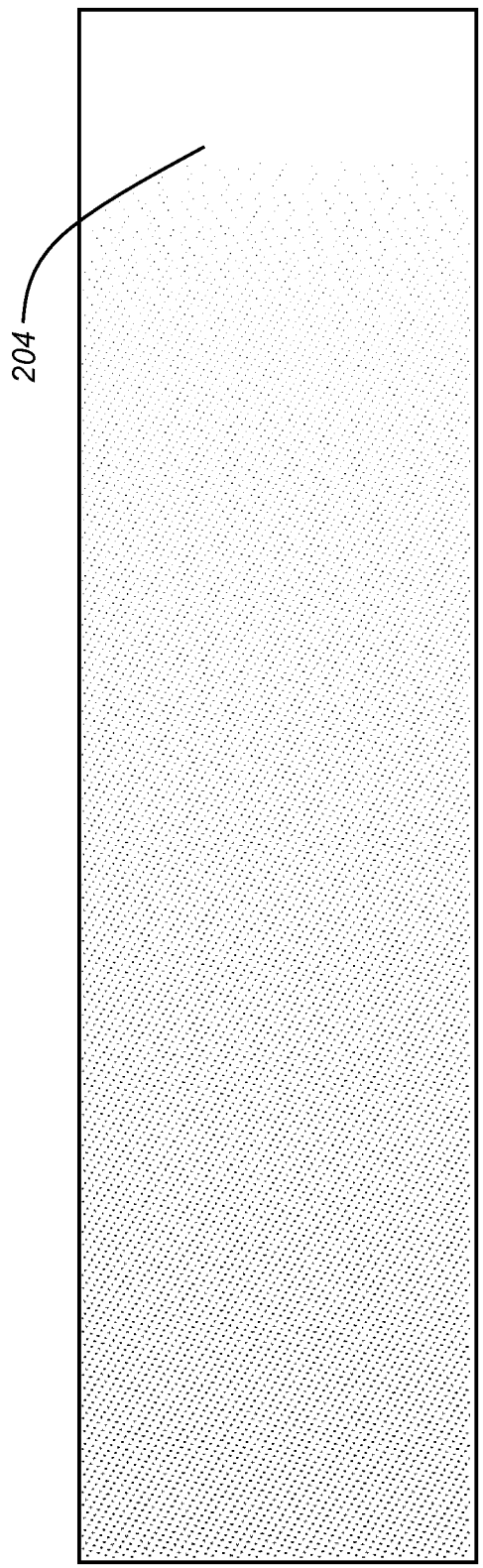
FIG. 2 represents in diagrammatic form a prior art halftone image ready to be exposed.

In order to process the screened image 204 shown in FIG. 2. The screened image 204 is fetched from storage element 132 (FIG. 1) by computer 130. A "natural" system of coordinates is defined, where X axis runs along image lines and Y axis is perpendicular to Y axis, and unit of measure is single pixel size, and its "shifted" system of coordinates, where X' axis and Y' axis run along mesh grid directions that is, rotated by screen angle related to natural system of coordinates and unit of measure stated res/mesh ratio.

Additionally, DS1 is defined as minimal reliably reproducible halftone dot size (in pixels) and DS2>=DS1 as halftone dot size (in pixels) corresponding to cutoff area coverage defining transfer from normal to "extreme" parts of tone scale. Separate halftone dots contained in the halftone image are identified and are processed in following the manner: if size of halftone dot is >=DS2, this halftone dot is not modified.

If size of halftone dot DS is <DS2, coordinates of its center of gravity Xc and Yc are calculated in natural system of coordinates, these coordinates are transformed into X'c and Y'c in shifted coordinates, and from these coordinates corresponding mesh cell indices Mx=floor(X'c) and My=floor (Y'c) are obtained. To these indices operator F(DS, mx, my) is applied, which returns 1 or 0 in such a way that average value $(1/Nds)\Sigma F(DS, mx, my)*DS2$, where sum is done for all halftone dots of size DS, is substantially equal to DS. Operator F can be analytical expression or simple lookup operation into predefined array. If operator F returns 0, we remove halftone dot by replacing all its pixels with pixels of an opposite color. If operator F returns 1, halftone dots are replaced with the halftone dots of the same shape and the same center of gravity, but of size DSn, where DSn is a value chosen out of array of values [DSn1, DSn2, . . . , DSnN] such as DSn1>=DS1,DSnX<DSn(X+1) and average value $(1/N)\Sigma$ (DSnX)==DS2.

This method ensures both consistent reproduction of halftone dots in regions with extreme values of tone scale via printing process and smooth, non-grainy, artifact-free appearance of said regions and transition regions from extreme values of tone scale to midtone ones.

In a preferred embodiment of the invention, an array of values [DSn1, DSn2, . . . , DSnN] contains four elements—DSn1, DSn2, DSN3 and DSn4 such that the size of element DSn1 is equal to DS1, minimal reliably reproducible halftone dot size (in pixels); size of elements DSn2, DSn3 and DSn4 is DS1+1, DS1+2 and DS1+3 pixels, respectively. Cutoff size DS2 in a preferred embodiment is defined as DS1+2 pixels.

Operator F(DS, mx, my) in the preferred embodiment is defined as a compare operation of a value derived from halftone dot size DS with a value from square lookup array B[N][N] where array size N is $2^n$, n>>8. Lookup array B[N][N] is uniformly filled with integer values from 0 up to $M=2^m-1$, m>=10 in such a way that a) array B[N][N] exhibits wraparound properties in both horizontal and vertical directions and b) when used as threshold array, results of threshold operation at any given level from 0 up to M exhibits blue-noise characteristics.

Screen angle is denoted as α, screen line ruling as mesh, image resolution as res and screen cell side length as r2 m=res/mesh. Given above these definitions, the preferred embodiment of the invention can be represented in pseudo code in following way:

```
While scanning a halftoned 1-bit image;
    identify halftone dots;
    assign each pixel to its respective dot.
    For each halftone dot
        If ( dot size in pixels DS >= DS2)
            continue to next halftone dot without modification;
    else modify dot as described below:
    {
    // calculate center of gravity
    Xc = (1/DS)ΣXpix (summation for all pixels of halftone dot)
    Yc = (1/DS)ΣYpix (summation for all pixels of halftone dot)
    // transform coordinates into shifted system of coordinates
    X'c = Yc*sin(α)+Xc*cos(α);
    Y'c = Yc* cos(α)–Xc*sin(α);
```

-continued

```
// Normalize to shifted coordinates units
  X'c = X'c/r2m;
  Y'c = Y'c/r2m;
// Calculate mesh cell indices
  Mx = floor(X'c);
  My = floor(Y'c);
// Calculate offset into lookup array
  Nx = Mx%N;
  Ny = My%N;
// Calculate effective area coverage for current halftone dot
  Coverage = DS*100/(r2m*r2m);
// Calculate compare value for thresholding operation with value //
from lookup array B
  cutoffCoverage = DS2*100/( r2m*r2m);
  percentToKeep = 100.* Coverage / cutoffCoverage;
  arrayCompareVal = (100.-percentToKeep)*(M+1) /100;
if (B[Nx][Ny]> arrayCompareVal)
        then remove halftone dot;
        else
        {
        Stochastically choose dot size from array of dot size values
          Put halftone dot of chosen size with the same center of gravity
      as original halftone dot
        }
}
```

Figure 3:
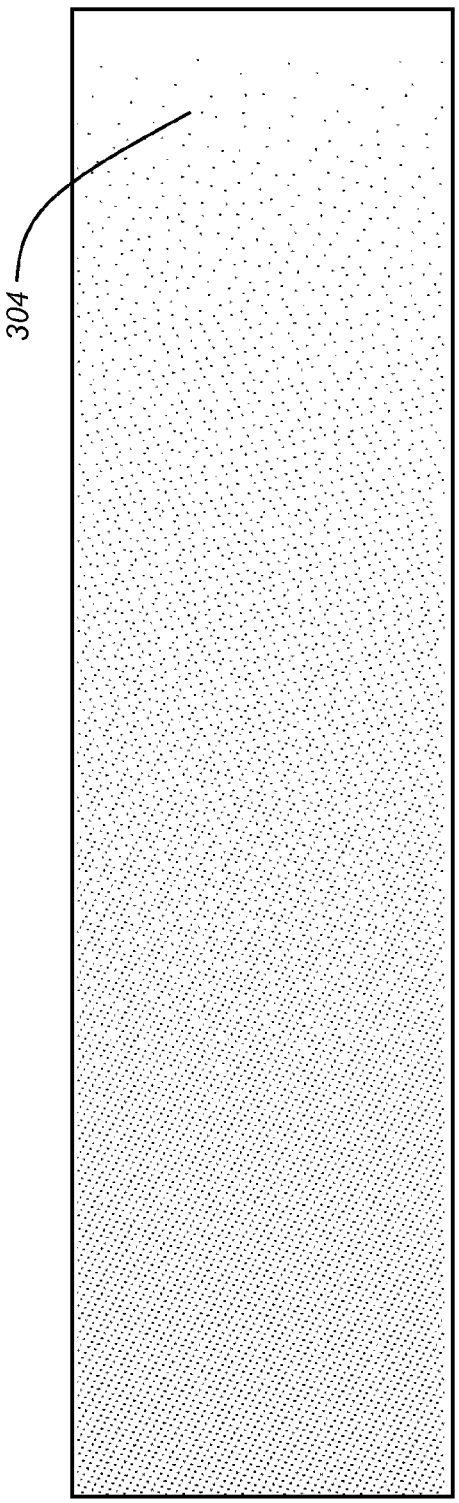
FIG. 3 represents in diagrammatic form an enhanced halftone image, enhancing the image shown in FIG. 2.

FIG. 3 shows the halftone image after enhancement. Numeral 304 shows an area of dots 304 which replaced the area of dots 204. The replaced dots 304 include a smaller number of dots compared to dots 204 which originally populated the area in FIG. 2. Each of the newly created dots 304 are larger in size than the original dots 204 and maintain the geometric characteristics of the dots 304 in terms such as center of gravity and angle.

Figure 4:
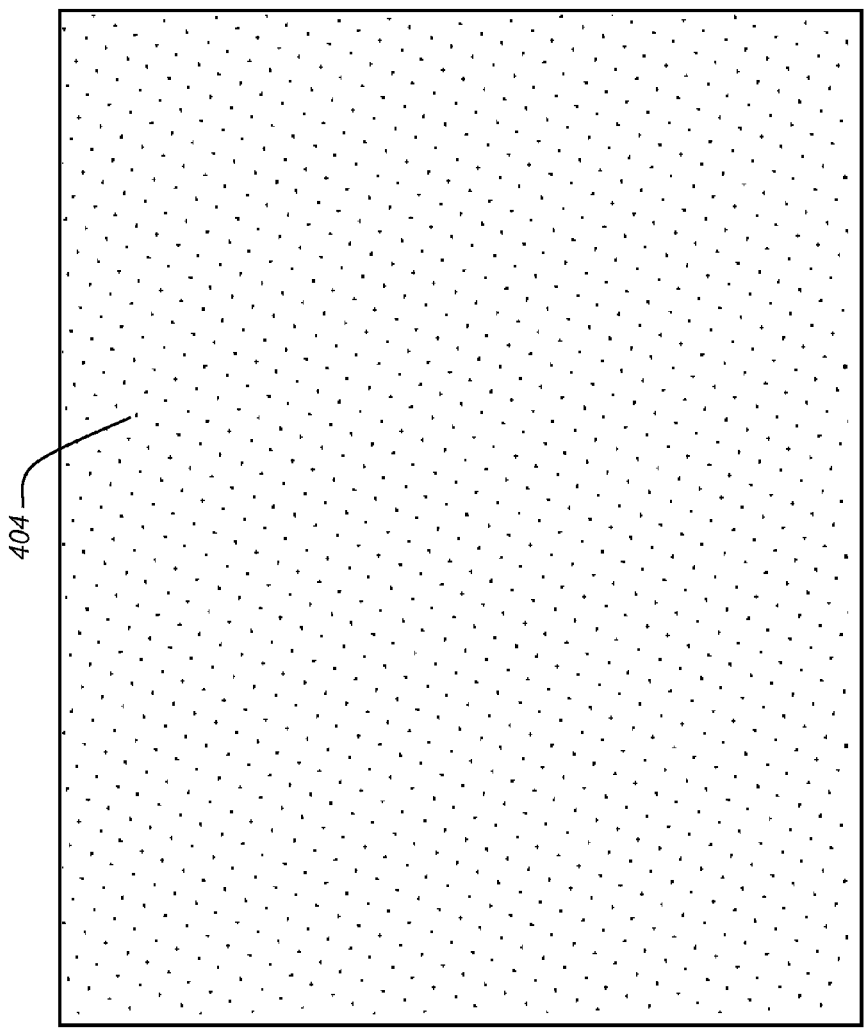
FIG. 4 represents in diagrammatic form a small dots area from a halftone image to be enhanced.
Figure 5:
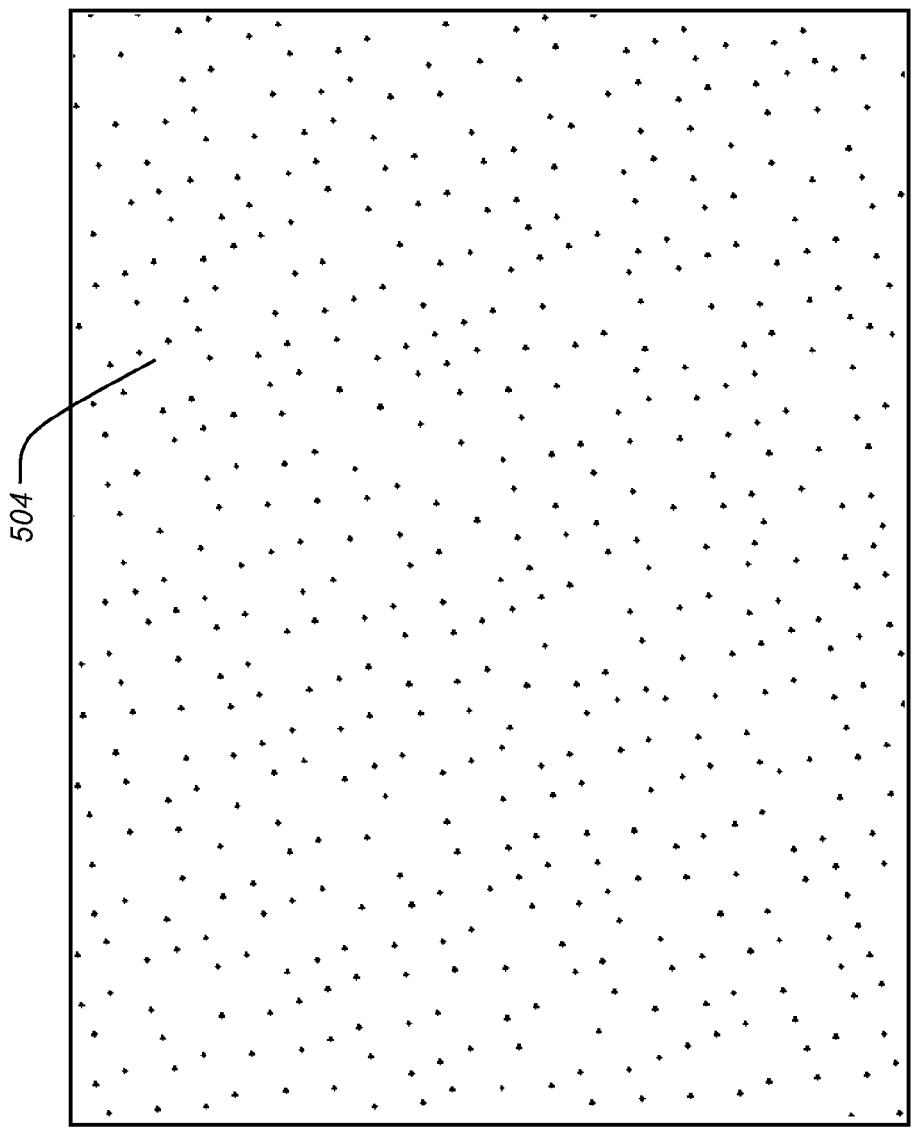
FIG. 5 show in diagrammatic form enhanced area of small dots shown in FIG. 4, the small dots were replaced with a set of fewer dots wherein each new dot is larger in size.

FIG. 4 shows a zoomed in area of small dots 404, wherein FIG. 5 shows dots 504 which are replacing dots 404. It can be seen much more clearly that the number of the replaced dots are fewer and each of the new dots 504 is larger than the original dots 404, however the geometrical layout of the dots 504 is maintained to be similar to the those shown for dots 404.

FIG. 1 shows an imaging system 100. The imaging system 100 includes an imaging carriage 112 mounted on an imaging head 120. The imaging head 120 is configured to image on a flexographic plate 108 mounted on a rotating cylinder 104. The carriage 112 is adapted to move substantially in parallel to cylinder 104 guided by an advancement screw 116.

The enhanced halftone 304 is delivered by controller 128 from computer 130 to imaging head 120 of imaging system 100, and is further exposed on flexographic plate 108, by imaging system 100 to form imaged flexographic plate.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention has been described in detail with particular reference to certain preferred embodiments thereof, but it will be understood that variations and modifications can be effected within the scope of the invention.

Parts List 100 imaging system
104 rotating cylinder
108 flexographic plate
112 carriage
116 screw
120 imaging head
128 controller
130 computer
132 data storage device
204 AM screened image before treatment
304 screened dots after treatment
404 area of small dots previously screened
504 area of screened dots after treatment

The invention claimed is:

1. A method for enhancing appearance of a halftone image for imaging on a flexographic plate comprising:
   retrieving the halftone image from a data storage device;
   setting a minimal dot size value for printing;
   analyzing the halftone image with a computer;
   detecting areas in the halftone image populated with a plurality of dots smaller than the minimal dot size value;
   replacing the plurality of dots with a reduced set of dots wherein each of the reduced set of dots are larger in size than the plurality of dots and wherein the reduced set of dots contains at least two different sizes and wherein each of said at least two different sizes are larger than the minimal dot size and wherein each of the reduced set of dots maintains an original geometric characteristics of the plurality of dots; and
   saving the reduced set of dots to the storage device.

2. The method according to claim 1 wherein the original geometric characteristics is a center of gravity of a dot.

3. The method according to claim 1 wherein the original geometric characteristics is an angle at which the dots are positioned.

4. The method according to claim 1 wherein the original geometric characteristics is a mesh of the dot.

5. The method according to claim 1 wherein each of the reduced set of dots is enlarged according to a dot size wherein the dot size is determined by stochastic pattern wherein the stochastic pattern exhibits blue noise characteristics.

6. The method according to claim 1 further comprising:
   printing the halftone image.

* * * * *